(12) United States Patent
Cody et al.

(10) Patent No.: US 7,729,584 B2
(45) Date of Patent: Jun. 1, 2010

(54) METHOD OF PROVIDING MID-SPAN ACCESS TO AN OPTICAL FIBER RIBBON CABLE AND THE OPTICAL FIBER RIBBON CABLE

(75) Inventors: Joseph Todd Cody, Hickory, NC (US); Radawan Hall, Granite Falls, NC (US); Christopher Paul Lewallen, Hudson, NC (US); James Phillip Luther, Hickory, NC (US); Bao Duy Nguyen, Charlotte, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/286,560

(22) Filed: Oct. 1, 2008

(65) Prior Publication Data

US 2010/0080522 A1    Apr. 1, 2010

(51) Int. Cl.
*G02B 6/44* (2006.01)
*G02B 6/00* (2006.01)

(52) U.S. Cl. .................................. 385/114; 385/135
(58) Field of Classification Search ................. None
See application file for complete search history.

(56) References Cited

U.S. PATENT DOCUMENTS

| | | | |
|---|---|---|---|
| 5,121,458 A | 6/1992 | Nilsson et al. | 385/100 |
| 5,125,060 A | 6/1992 | Edmundson | 385/100 |
| 5,210,812 A | 5/1993 | Nilsson et al. | 385/100 |
| 7,277,615 B2 | 10/2007 | Greenwood et al. | 385/100 |
| 7,422,378 B2 * | 9/2008 | Lu et al. | 385/95 |
| 2007/0263964 A1 | 11/2007 | Cody et al. | 385/100 |
| 2007/0263965 A1 | 11/2007 | Cody et al. | 385/100 |
| 2007/0263966 A1 | 11/2007 | Cody et al. | 385/112 |

* cited by examiner

*Primary Examiner*—Omar Rojas

(57) ABSTRACT

A method of facilitating mid-span access of an optical fiber ribbon cable, and the resulting cable, that provides for redeveloping and/or modifying excess ribbon length with the accessed cable structure. The method includes the use of a form placed within the cable structure that controls the excess ribbon length. The method may further include the reconstitution of severed strength members.

43 Claims, 9 Drawing Sheets

METHOD OF PROVIDING MID-SPAN ACCESS TO AN OPTICAL FIBER RIBBON CABLE AND THE OPTICAL FIBER RIBBON CABLE

BACKGROUND OF THE INVENTION

1. Field of the Invention

This invention is directed to a method of accessing one or more optical fiber ribbons at an intermediate point along a length of optical fiber ribbon cable, and more particularly to managing the excess ribbon length at the access point.

2. Technical Background

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data with a reasonable cable diameter. Consequently, optical fiber cables replaced most of the copper cables in long-haul communication network links, thereby providing greater bandwidth capacity for long-haul links. Still, most communication networks still use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from fully utilizing the relatively high-bandwidth capacity of the optical fiber long-hauls links.

As optical fibers are deployed deeper into communication networks, subscribers will have access to increased bandwidth. But certain obstacles exist that make it challenging and/or expensive to distribute optical fibers toward the subscriber from fiber optic cables.

Optical fiber cables should at once have small cross sections, be light, and yet provide maximum protection to the optical fibers housed within. An optical fiber ribbon comprises a plurality of optical fibers bonded together, generally in a planar arrangement, and provides a cost effective way to obtain a high optical fiber density within a given cable structure. Cables may contain one or more optical fiber ribbons, usually divided into one or more stacks of many individual ribbons, and may have total fiber counts that extend into the thousands of fibers.

Optical fiber cables stretch under load, and similar to their loose fiber counterparts, ribbon cables may be manufactured in a manner such that a total length of a given ribbon is longer than the total cable length. The ribbon length that exceeds the cable length is referred to as the "excess ribbon length", and its presence allows, inter alia, for stretching of the cable without severely straining the optical fibers within. Undue strain may cause the optical fibers comprising the ribbons to exceed their breaking stress.

From time to time there may be a need to access an optical fiber/optical fiber ribbon at an intermediate point between the cable ends, a process commonly referred to as mid-span access. For example, there may be a need to reroute an individual optical fiber ribbon, or one or more individual optical fibers that comprise a ribbon, in a direction that varies from the routing direction of the remainder of the ribbons in the cable. This is especially true in a distribution cable. Common names for this process include "breakout" or "furcation" (e.g. bifurcation), or a "tap". That is, mid-span access may be necessary to tap into a cable and produce further, separate routing for portions of the original cable. These further separate routings, are variously referred to as "drop" cables or tether cables.

Mid-span access requires that the sheath or jacket surrounding the internal cable structure, and other intervening interior cable structure, be removed or otherwise opened to allow access to the optical fibers ribbons within the cable. A common problem encountered during a mid-span access operation is that once the cable has been breached, the excess ribbon length causes the optical fiber ribbons to spring out from the opened cable structure. Reconstituting the cable after the splice has been completed is thus problematic—it can be quite difficult to re-insert the ribbon, thus released, into the cable. Another problem that may be encountered is repairing a severed strength member during a mid-span access. As can be imagined, these tasks are difficult under the best of conditions, therefore the manufacture of preteiminated cables having the requisite number of taps is often undertaken in a factory setting. Still, the above difficulties must be overcome.

SUMMARY

Unlike previous methods to accomplish mid-span access to optical fiber ribbon cables, such as optical ribbon distribution cables, embodiments of the present invention are suitable for use with cables comprising high levels of excess fiber length. The long access opening facilitates the use of various forms that can be deployed within the cable after a tap has been made to manage the excess ribbon length, and in some cases may result in an excess ribbon length within the reconstituted "access portion" of the cable that is substantially equal to the excess ribbon length in a portion of the optical ribbon cable that has not been accessed (the "virgin" portion of the cable).

In one embodiment, a method of performing a mid-span access on an optical fiber ribbon cable is disclosed including providing an optical fiber ribbon cable comprising a cable sheath and at least one optical fiber ribbon disposed therein, the optical fiberribbon having a first excess ribbon length, removing a portion of the cable sheath to expose a length of the at least one optical fiber ribbon, conforming the exposed length of the at least one optical fiber ribbon to a predetermined path, wherein the exposed length of the at least one optical fiber ribbon comprises a second excess ribbon length and covering the exposed length of the at least one optical fiber ribbon with an elastomeric material.

In another embodiment, a method of performing a mid-span access on an optical fiber ribbon cable is described comprising providing an optical fiber ribbon cable comprising a cable sheath defining a cavity, and at least one optical fiber ribbon disposed within the cavity, the optical fiber ribbon comprising at least two optical fibers and having an excess ribbon length, removing a portion of the cable sheath to form an access opening to the cavity and expose a length of the at least one optical fiber ribbon, conforming the exposed length of the at least one optical fiber ribbon to a predetermined path defined by a form and covering the exposed length of the at least one optical fiber ribbon and the form with an elastomeric material that protects the exposed length of the at least one optical fiber ribbon and the form.

In still another embodiment, a method of performing a mid-span access on an optical fiber ribbon cable is described comprising providing an optical fiber ribbon cable comprising a cable sheath, at least one optical fiber ribbon, and at least one strength member, the optical fiber ribbon comprising at least two optical fibers and having a first excess ribbon length, removing a portion of the cable sheath to expose a length of the at least one optical fiber ribbon, severing the at least one strength member to form a first severed end and a second severed end, conforming the exposed length of the at least one optical fiber ribbon to a predetermined path having a second excess ribbon length, rejoining the at least one severed strength member by splicing the first severed end to the second severed end and covering the exposed length of the at least one optical fiber ribbon with an elastomeric material that protects the exposed length of the at least one optical fiber ribbon and the form.

In yet another embodiment, an optical fiber ribbon cable is described comprising a cable jacket comprising a virgin portion and an access portion, at least one optical fiber ribbon disposed within the cable jacket, the at least one optical fiber ribbon comprising a first excess ribbon length within the virgin portion of the ribbon cable and a second excess ribbon length within the access portion of the ribbon cable, an elastomeric material disposed over the access portion and wherein a length of the at least one optical fiber ribbon in the access portion of the ribbon cable is conformed to a form for managing the second excess ribbon length.

In another embodiment, a optical fiber ribbon cable is disclosed comprising a cable jacket comprising a virgin portion and an access portion, at least one optical fiber ribbon disposed within the cable jacket, the at least one optical fiber ribbon comprising a first excess ribbon length within the virgin portion of the ribbon cable and a second excess ribbon length within the access portion of the ribbon cable, at least one strength member extending through the cable jacket, an elastomeric material disposed over the access portion and wherein the at least one strength member comprises a spliced portion within the access portion of the cable jacket.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods, features and advantages be included within this description, be within the scope of the present invention, and be protected by the accompanying claims.

DETAILED DESCRIPTION

Figure 1:
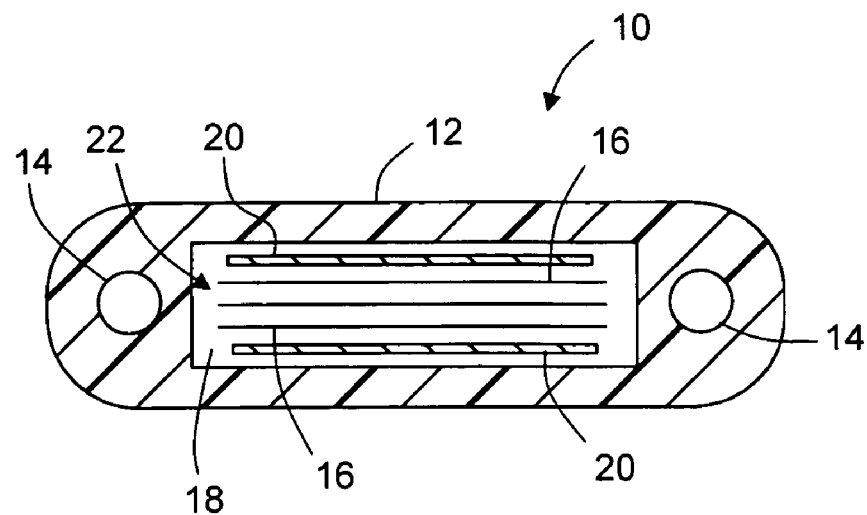
FIG. 1 is a transverse cross sectional view of a ribbon cable according to an embodiment of the present invention.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Shown in FIG. 1 is a cross sectional view of an exemplary optical fiber ribbon distribution cable 10. Optical fiber distribution cable 10 comprises protective covering or sheath 12, one or more strength members 14, one or more optical fiber ribbons 16 disposed in cavity 18 defined by sheath 12 and optional water swellable tape 20. If distribution cable 10 contains more than one ribbon, the ribbons are generally arranged in a parallel stack 22. Sheath 12 is typically a polyethylene material and provides overall protection to the interior components of the optical fiber cable. If uncut, sheath 12 prevents ingress of water to the one or more optical fiber ribbons 16. However, should sheath 12 be breached, or water enter the cable interior cavity through an unprotected cable end, water swellable tape 20 is designed to swell in the presence of water and close off the point of ingress, thereby providing protection against flooding of the cable interior.

As the name implies, strength members 14 provide overall tensile strength to the cable. Strength members 14 are typically manufactured from dielectric materials such as glass reinforced plastic (GRP). However strength members 14 may, in some embodiments, be metallic (e.g. steel). The following description will assume GRP strength members, but should not be read as limiting in this regard. Other materials, including various metals, may be used to form strength members 14.

As described briefly above, water swellable tape 20 may be used instead of gel to avoid the mess associated with gels when working with the cable. The tape is typically impregnated with a compound (e.g. a super absorbent polymer) that swells in the presence of moisture. This swelling can be effective in blocking further ingress of moisture into the interior of the cable, as optical fibers may exhibit a loss of signal amplitude (attenuation) when exposed to moisture for prolonged periods. Water swellable tapes, such as those manufactured by Scapa®, are readily commercially available.

Figure 2:
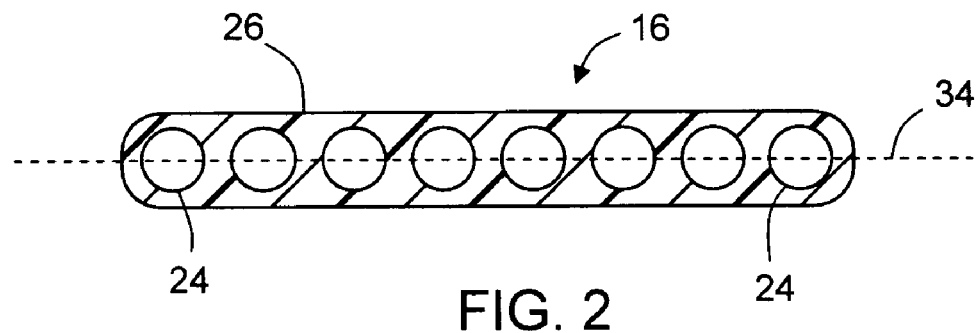
FIG. 2 is a transverse cross sectional view of an exemplary optical fiber ribbon comprising the ribbon cable of FIG. 1.
Figure 3:
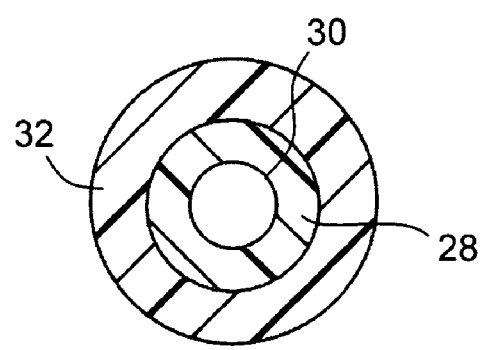
FIG. 3 is a transverse cross sectional view of an exemplary optical fiber comprising an optical fiber ribbon of FIG. 2.

As shown in FIG. 2, the at least one optical fiber ribbon 16 comprises two or more optical fibers 24 encased within matrix 26 to form a ribbon. Each optical fiber in turn comprises a glass member, and one or more coatings surrounding the glass member. The one or more optical fiber coatings are usually ultraviolet (UV) light curable acrylate materials, and the different coatings may, for example, exhibit different properties from one another (e.g. elastic modulus). As illustrated by the exemplary optical fiber in FIG. 3, optical fibers typically comprise two coatings—a soft inner or primary coating 28 in contact with the glass portion 30, and a tougher outer or secondary coating 32 surrounding and in contact with the primary coating. Matrix 26 may also include one or more layers, such as one or more layers of a UV curable acrylate material similar to the optical fibers.

The optical fibers of a ribbon are preferably parallel (i.e. form a planar arrangement) such that a line connecting a center of each optical fiber (e.g. line 34 in FIG. 2) is a substantially straight line. Optical fiber ribbons come in many different designs, and may include 2 fibers, 4 fibers, 8 fibers, 12 fibers, 24 fibers, 36 fibers or more per ribbon. Intermediate optical fiber counts are also possible. A typical fiber count for the one or more optical fiber ribbons of FIG. 1 is 12 or 24 fibers per ribbon, but this should not be construed as limiting in this regard. The optical fiber count for multiple ribbons in the same stack is preferably the same. That is, all ribbons in a stack preferably contain the same number of optical fibers.

Figure 4:
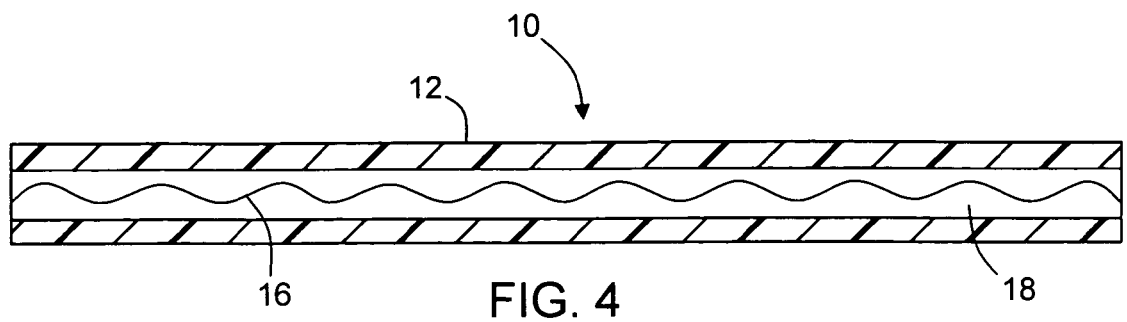
FIG. 4 is a longitudinal cross sectional view of an optical fiber ribbon cable according to an embodiment of the present invention showing excess ribbon length.

FIG. 4 is a longitudinal cross sectional view of the optical fiber distribution cable 10 of FIG. 1 showing an edge view of a single optical fiber ribbon 16 as it extends down a length of the cable. Other components of the cable have been omitted so as not to obscure the ribbon. As illustrated, ribbon 16 may undulate in a serpentine manner down the length of the cable. Thus, as is readily apparent, the length of the ribbon (and therefore of the individual optical fibers comprising the ribbon) for a given length of cable may be longer than the given cable length. It is typical for cable manufacturers to include this extra length of fiber/ribbon to accommodate stretching of the cable, such as when the cable is pulled to place the cable in a desired position. Thus, if the cable experiences strain, for instance when pulling the cable through a conduit, the cable may stretch while minimizing strain on the optical fiber/ribbon within the cable. This extra fiber/ribbon length is referred to as excess fiber length when referring to an individual fiber, or, in the case of ribbon, excess ribbon length (ERL). The excess ribbon length may be characterized as the difference, in units of length, between the length of a ribbon and the given length of cable in which the ribbon is disposed, or more commonly, the excess ribbon length may be expressed as a percentage of the given cable length. For example, a cable having a 0.1% excess cable length may be interpreted as: for any given length of cable, the length of the ribbon or ribbons contained within is 0.1% longer than the given cable length. By way of a practical example, for a cable having 0.1% excess ribbon length, and where the overall length of the cable is 1 km, the length of a ribbon disposed therein would be 1.1 km.

A need may arise where mid-span access to a single fiber ribbon, or even a single fiber within a ribbon, may be desired. For example, a cable carrying tens or perhaps hundred of optical fibers arranged in multiple ribbons and further arranged in a stack within a cable sheath may need to be accessed intermediate the ends because one group of ribbons/fibers must go in one direction, while another group goes in a different direction. This might be handled by an installer by carefully removing a portion of cable sheath 12 for a short (e.g. 7-10 cm) predetermined length intermediate the ends of the cable (i.e. "mid-span"). The ribbon at the top of the stack is then accessed, such as by threading an appropriate tool into the opening to segregate and sever the appropriate ribbon, and to subsequently pull the desired ribbon, or portion thereof, through the opening created by removing the sheath, while at the same time trying to keep the remaining ribbons within the sheath. Unfortunately, the elastic nature of the optical fibers comprising the ribbons, combined with the ERL, may cause the ribbons to spring out of the opening. While many cable designs have an ERL of about 0.1% or less, some cable designs may have an ERL of at least about 0.2%, at least about 0.4%, at least about 0.6%, and in some cases at least about 0.8%, making the task of retaining the ribbons in the sheath particularly difficult. The cable may be reconstituted by shrink wrapping the opening with a shrink wrapping material, but getting the ribbons and the excess ribbon length that may be ejected back into the cable can be problematic for such short openings. More importantly, the ability to reconstitute the deployment of the ribbon or ribbons within the accessed cable length (e.g. the serpentine shape of the ribbons) can be significantly impaired. More conventionally, such taps are created in a more controlled environment rather than the field, such as a facility of the cable manufacturer where the cable may be preterminated prior to delivery to the customer. In such cases, a customer may order a cable of a desired length having as many taps as necessary for the predetermined installation scheme. That is, the customer has a predetermined network design requiring a cable having a predetermined number of taps, and the requisite cable length with taps is custom made at the cable manufacturer's facility. Nevertheless, in spite of the often optimized working environment, the previously described issues may remain.

In accordance with embodiments of the present invention, a method is provided that allows for mid-span access of a ribbon cable and reconstitution of the cable in a manner that re-establishes and controls the ERL within the cable.

Figure 5:
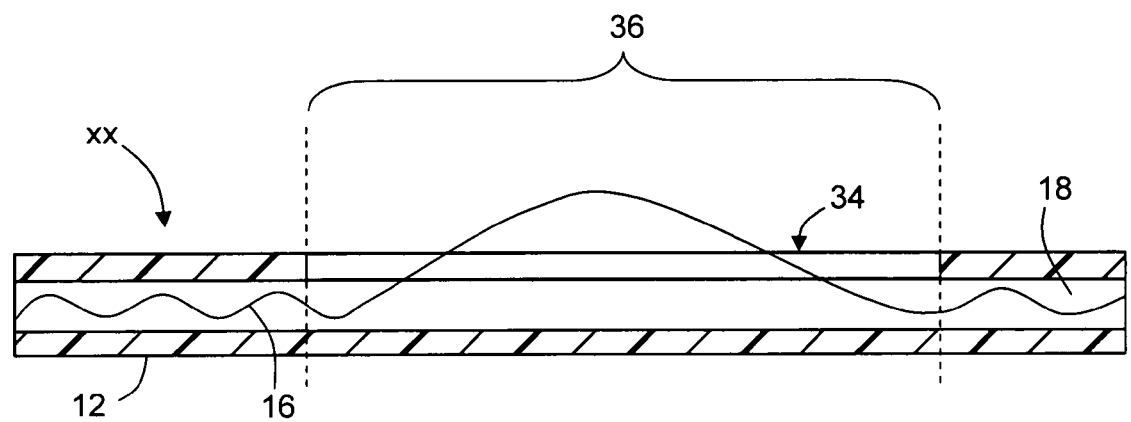
FIG. 5 is a longitudinal cross sectional view of the ribbon cable of FIG. 4 showing an opening made therein to create an access portion of the cable.

FIG. 5 illustrates a cross sectional view of optical fiber distribution cable 10 wherein an opening 34 has been made in the cable sheath to expose the optical fiber ribbon disposed within the cable sheath. In certain embodiments, the opening may extend along a length of the cable for at least about 25 cm. In certain other embodiments, the opening may extend for at least about 30 cm, 35 cm, 40 cm or even in excess of 50 cm. While such large (long) openings would have been undesirable using conventional methods of forming taps for the foregoing reasons, by practicing methods of the present invention such long openings are easily facilitated, and indeed encouraged, as they provide significantly more working room for the craftsperson performing the task.

For the purpose of further discussion, the portion of the optical fiber cable comprising the opening will be referred to as access portion 36 of the cable. Because of the ERL, the exposed length of ribbon is longer than the length of the access portion. Indeed, the exposed length of ribbon may exceed even the length of the access portion plus the initial ERL, as movement (e.g. straightening) of the ribbon adjacent both ends of the access portion, unless otherwise prevented, may further increase the exposed ribbon length in the access portion. Advantageously, the extended length of the access portion (e.g. opening 34) allows access to all ribbons in a stack, not just a "top" ribbon. That is, in some embodiments, a ribbon at an intermediate position within the ribbon stack may be tapped.

Figure 6:
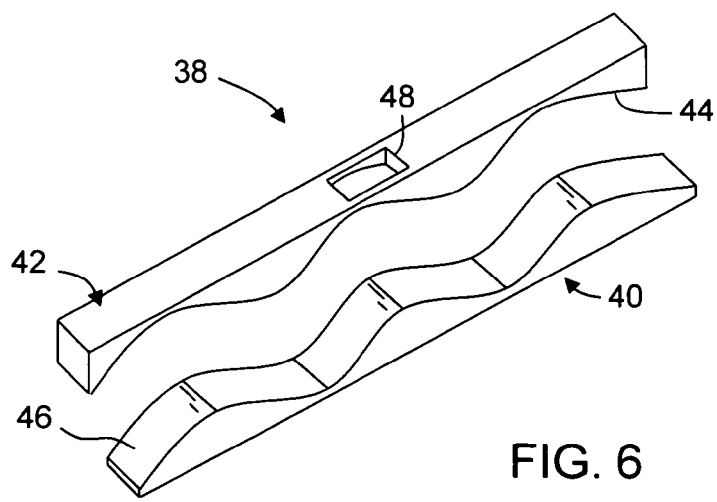
FIG. 6 is a perspective view of a form for controlling excess ribbon length according to an embodiment of the present invention.

In accordance with an embodiment of the present invention, the exposed ribbon length may be made to conform to a predetermined path that controls the excess ribbon length. For example, shown in FIG. 6 is a form 38 that may be used to conform the exposed ribbon to a predetermined shape. Additionally, the form may provide sufficient force between the ribbons that materials that may be used to reconstitute the ribbon cable at the access portion do not ingress between ribbons, although in some embodiments the long access portion can enable a soft adhesive gel to be intentionally disposed between the ribbons. Form 38 may be inserted into the opening in the access portion, and the at least one ribbon comprising the ribbon cable made to conform to the shape of the form. Thus, the at least one ribbon can be provided with a serpentine shape that accommodates the excess ribbon length of the exposed length of ribbon. The at least one ribbon can be made to have a shape with any predetermined amplitude and/or periodicity.

In the embodiment shown in FIG. 6, form 38 comprises a first form member 40 and a second form member 42, wherein second form member 42 may be positioned over first form member 40 so that the at least one ribbon is disposed between the first and second form members. Second form member 42 is preferably complimentary to first form member 40. That is, the shape (e.g. serpentine) of a surface 44 of the second form member matches the shape of a surface 46 of the first form member so that when positioned one over the other with surface 44 opposite surface 46, the two forms fit together. As depicted in FIG. 6, first and second form members 40, 42 according to one embodiment comprise a series of crests and troughs such that the surfaces of the form/form members between which the ribbon or ribbons are constrained are approximately sinusoidal in nature. Indeed, the surfaces may be sinusoidal or merely approximate a sinusoid. The crests and troughs of form members 40, 42 may have any suitable amplitude or periodicity, depending on the need. For example, a large diameter cable may be able to accommodate forms with greater amplitude. More excess ribbon length may require greater periodicity in the forms (e.g. more crests and troughs). In other embodiments, the ribbons may be constrained to have an extreme "S" shape where the ribbons may be made to double back on themselves.

Referring again to FIG. 6, second form member 42 may further define aperture 48, wherein one or more optical fibers of a ribbon disposed between the form members can be severed and threaded through the aperture, making the one or more fibers available for splicing to one or more other fibers, as will be explained more fully below. When the cable is reconstituted, such as by coating or otherwise covering the opening in the access portion of the cable, form 38 remains within access portion 36 of the cable and is sealed within.

Figure 7:
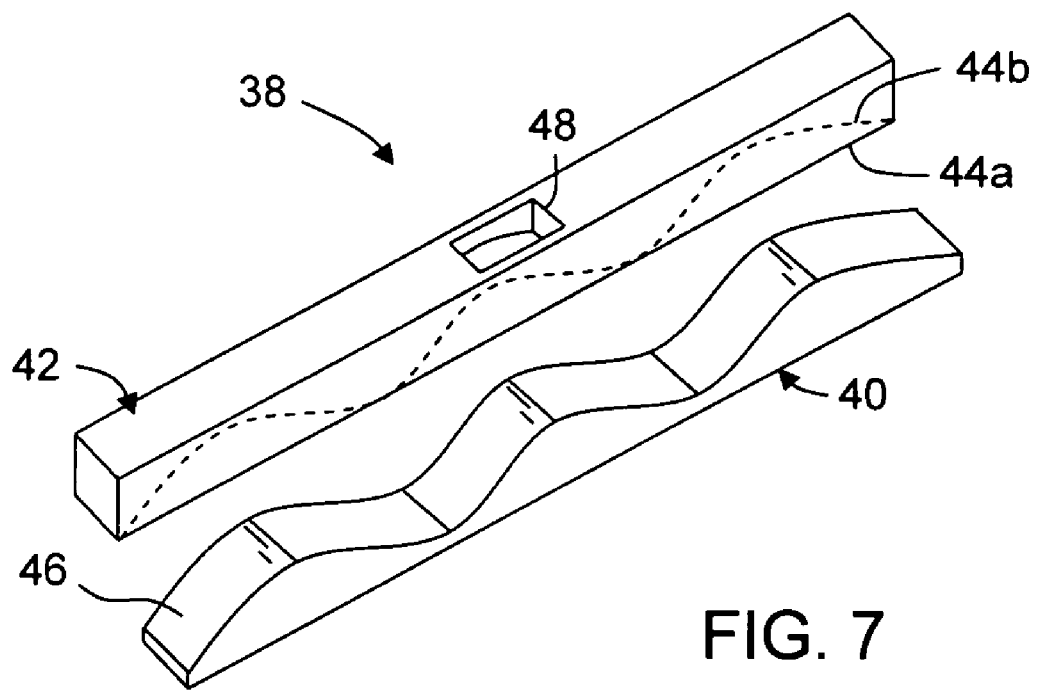
FIG. 7 is a perspective view of another embodiment of a form for controlling excess ribbon length.

In an alternative embodiment shown in FIG. 7, one form member may be suitably non-compliant while the other form member is compliant, so that when the compliant form member is positioned over the non-compliant form member, the compliant form member is molded into the shape of the non-compliant form member. For example, first form member 40 may be substantially non-compliant and comprise a sinusoidal surface. On the other hand, second form member 42 may be constructed from a compliant material, such as plastic foam, that takes on the shape of an object that is pressed against the second form member. Thus, in the uninstalled condition, compliant form member 42 has a non-complimentary shaped surface 44a, but when positioned such that ribbon 16 is disposed between the compliant and non-compliant form members (the installed condition), the surface of the compliant form member adjacent the ribbon takes on a complimentary shape, as indicated by dotted line 44b. Form 38 should be sufficiently rigid to conform the at least one ribbon into a predetermined shape, but sufficiently flexible so the bending performance of the reconstituted portion of the cable is not significantly impeded In another alternative, a removable form may be employed wherein once the at least one ribbon has been conformed to a particular path (shape) by the form, the ribbon may be stiffened, such as by applying a suitably rigid-curing adhesive to the edges of the ribbon. Once the adhesive has cured, the form may be removed, while leaving the ribbon or ribbons in the predetermined shape of the form. Thus, the at least one ribbon is molded to a predetermined shape that can be re-inserted into the cable and the cable thereafter reconstituted by covering the access portion of the cable.

Figure 8:
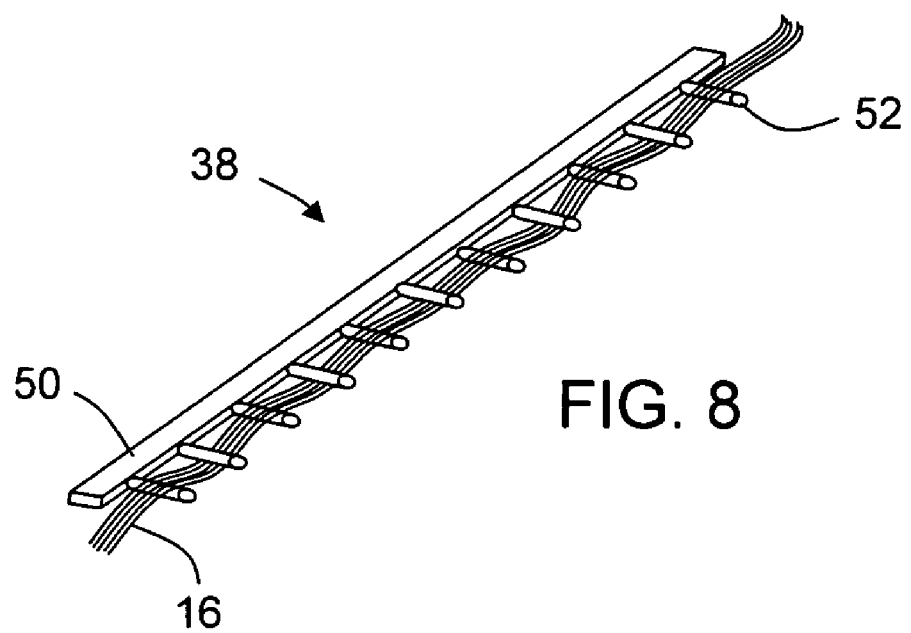
FIG. 8 is a perspective view of yet another embodiment of a form for controlling excess ribbon length.

In still another alternative embodiment, form 38 may comprise a "comb", wherein form 38, illustrated in FIG. 8, includes a back portion 50 and a plurality of teeth 52 extending therefrom. In the present embodiment, the optical fiber ribbon or ribbons may be threaded between the teeth to place the ribbon or ribbons into a generally serpentine shape, as shown.

Figure 9:
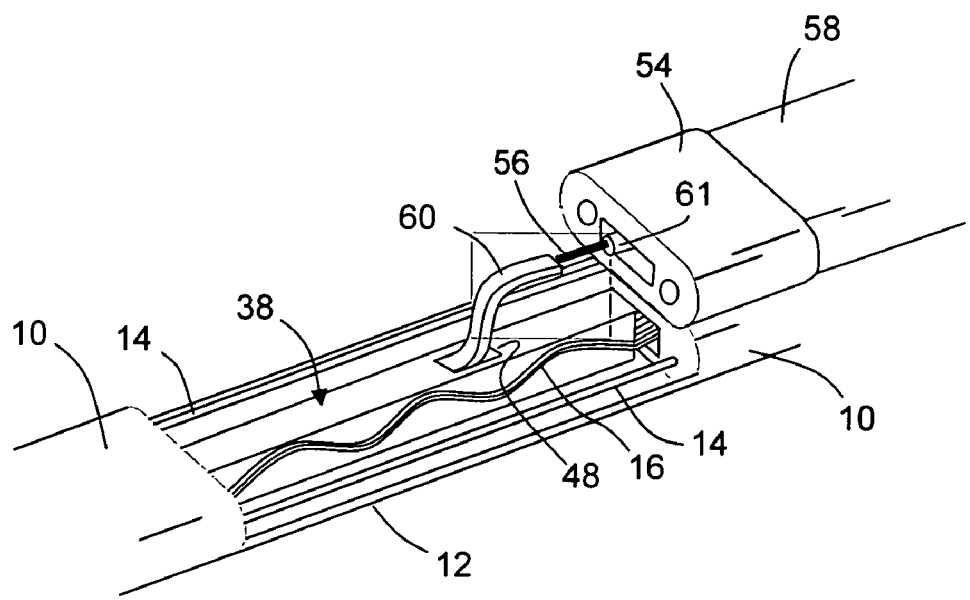
FIG. 9 is a partial cutaway in perspective showing the access portion of an optical fiber ribbon cable wherein a fiber has been severed from a ribbon and routed to a tether cable, and wherein the fiber has been spliced to the tether cable.
Figure 10:
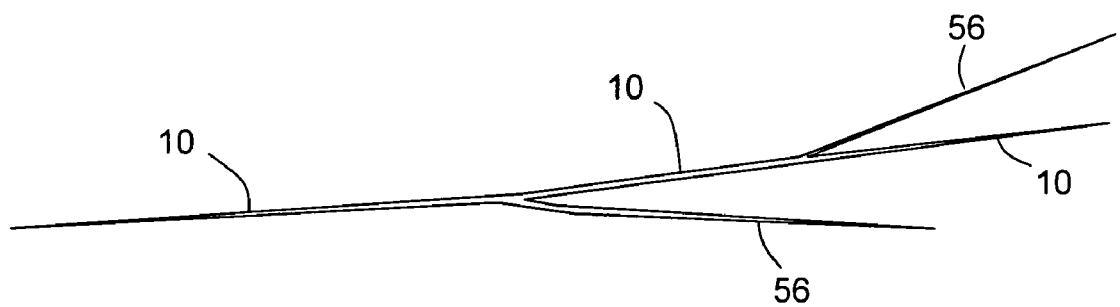
FIG. 10 depicts a ribbon cable according to an embodiment of the present invention comprising several tether cables connected thereto.

As depicted in FIG. 9, splice enclosure 54 may be provided to accommodate a splice between at least one severed optical fiber 56 and another optical fiber from tether cable 58. For example, splice enclosure 54 may be a short length of cable similar to cable 10 wherein all of the interior components of the cable have been removed, leaving only the sheath and the strength members. Thus, splice enclosure 54 may simply be the husk or carcass of another cable. Such a splice enclosure is illustrated in FIG. 9. Splice enclosure 54 may be bonded to tether cable 58, such as by welding or sealing one to the other, and/or by over coating both the splice enclosure and the tether cable together. Tether cable 58 comprises the spur or tap that provides alternate routing for one or more optical fibers comprising ribbon cable 10. This concept is illustrated in FIG. 10 showing ribbon cable 10 comprising several tether cable taps (points at which tether cables have been spliced to ribbon cable 10).

Returning to FIG. 9, a buffer tube 60 may be used to guide and protect the one or more optical fibers to be spliced as they traverse from form 38 to splice enclosure 54. For example, buffer tube 60 may cooperate with aperture 48, such as by fitting the buffer tube into the aperture 48. Additionally, a splice tube 61 may be used to encapsulate and protect the splice (not shown) within splice enclosure 54.

Figure 11:
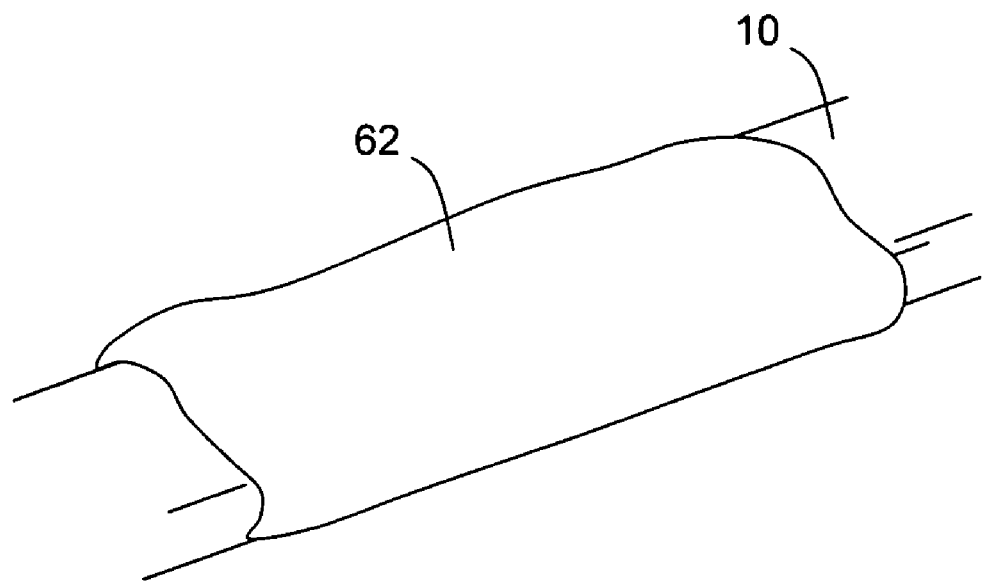
FIG. 11 is a perspective view of an access portion of a ribbon cable according to an embodiment of the present invention where the access portion has been covered with a protective covering.

Access portion 38 of ribbon cable 10, and particularly the one or more optical fiber ribbons 16, is preferably protected by coating 62 shown in FIG. 11. Coating 62 may comprise one or more layers, and may be applied before or after the one or more optical fibers of the ribbon cable have been spliced to corresponding optical fibers of the tether cable. The protective coating may, for example, comprise a first inner layer surrounded by a second outer layer. Preferably, the innermost layer is softer than the outer most layer. The inner layer may comprise a soft, elastomeric material core and the outer layer may, for example, comprise a shrink wrap tube that is positioned over the core layer and heated to shrink the shrink wrap tube onto the core. In another embodiment, the outer layer may be a crush resistant flexible tube that is positioned about the access portion. An elastomeric core material may then be injected into the tube so that the elastomeric material fills the interfacial void between the access portion and the crush resistant tube. More generally, the material comprising the outer layer should, for instance, have a higher modulus of elasticity than the material comprising the inner layer.

Figure 12:
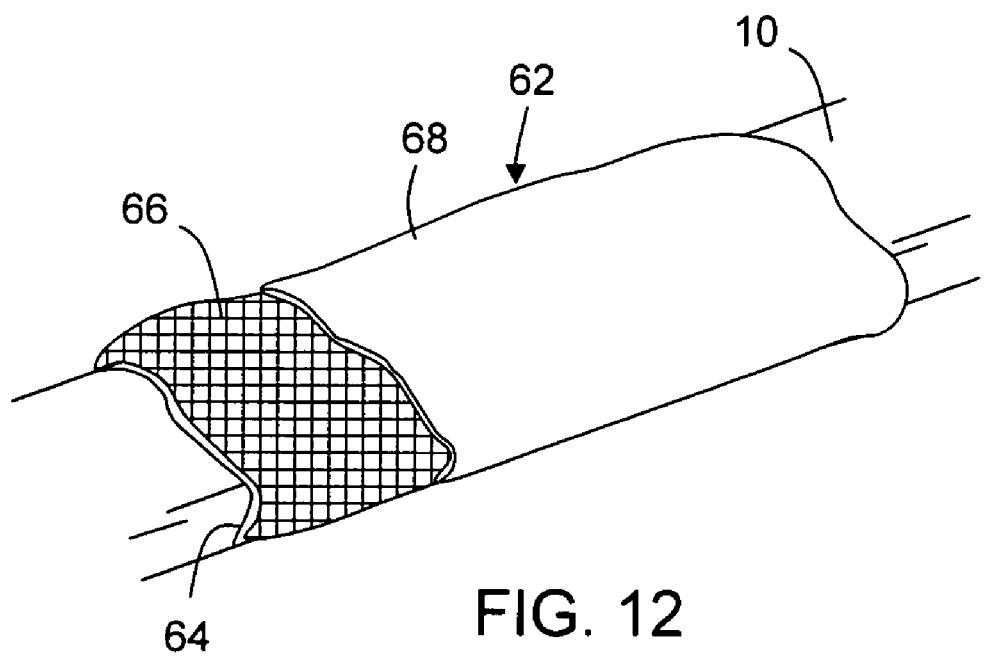
FIG. 12 is a perspective view of another embodiment of a covering for protecting the access portion of the ribbon cable.
Figure 13A:
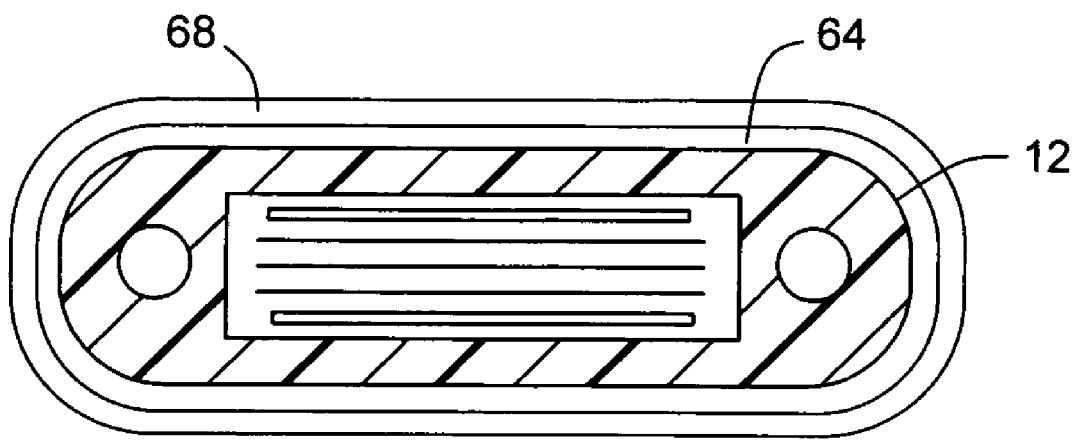
FIG. 13A is a transverse cross sectional view of the access portion of the ribbon cable of FIG. 11 showing the covering for protecting the access portion.
Figure 13B:
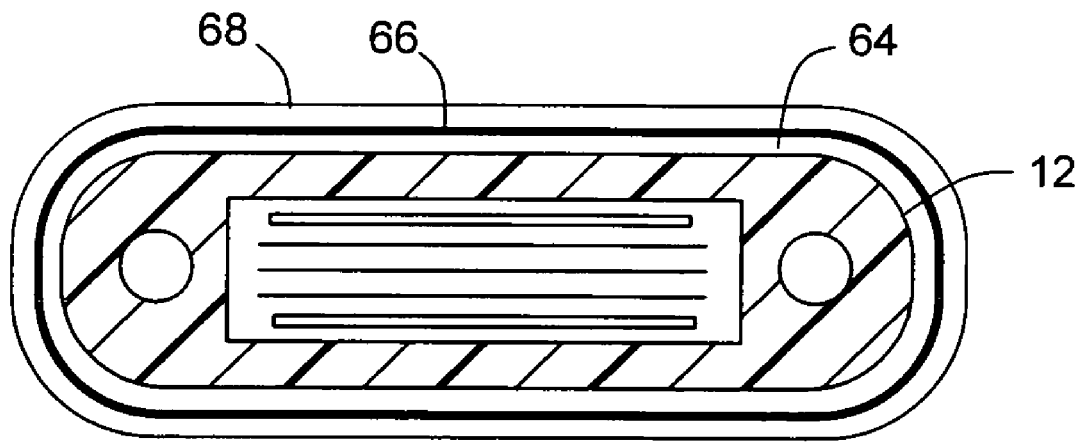
FIG. 13B is a transverse cross sectional view of the access portion of the ribbon cable of FIG. 12 showing the covering for protecting the access portion.

The protective coating may include more than two layers. In yet another embodiment illustrated in FIG. 12, coating 62 may comprise a core inner layer 64 of a soft elastomeric material formed on the access portion, after which a cloth or mesh layer 66 is placed over the inner layer, and a third, outer layer 68 of flexible material is then deposited over the mesh material to bond the mesh material to the first layer. The mesh may, for example, be a carbon fiber mesh or in some embodiments, a metal mesh. Preferably, the outer layer should be harder than the soft inner layer (e.g. have a higher elastic modulus and toughness). A cross sectional view of a coating 62 having an inner layer 64 and an outer layer 68 is depicted in FIG. 13A, while a cross sectional view of a coating 62 having an inner layer 64, an outer layer 68 and further comprising a mesh layer 66 disposed between the inner and outer layers is depicted in FIG. 13B.

Figure 14:
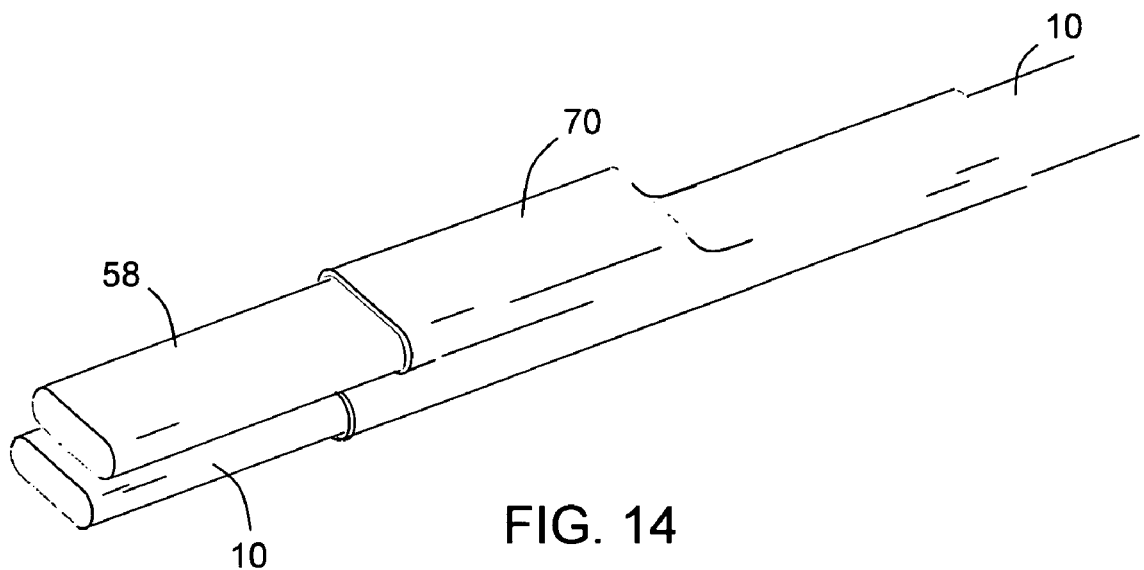
FIG. 14 is a perspective view of a pre-formed sleeve according to an embodiment of the present invention for holding and protecting the tether cable (and splice holder) and ribbon cable access portion.

In still another embodiment, shown in FIG. 14, a preformed plastic sleeve 70 may be positioned over both ribbon cable 10 and tether cable 58. Sleeve 70 may be placed over coating 62 for example. Sleeve 70 is preferably sized to accommodate splice enclosure 54 as well as at least a portion of ribbon cable 10. In certain embodiments, splice enclosure 54 may be pre-assembled within sleeve 70 such as by gluing.

While the above description highlights certain aspects of a mid-span access, the following description will address a more detailed view of an embodiment of the present invention that includes a method for mid-span access of an optical fiber ribbon cable.

Figure 15:
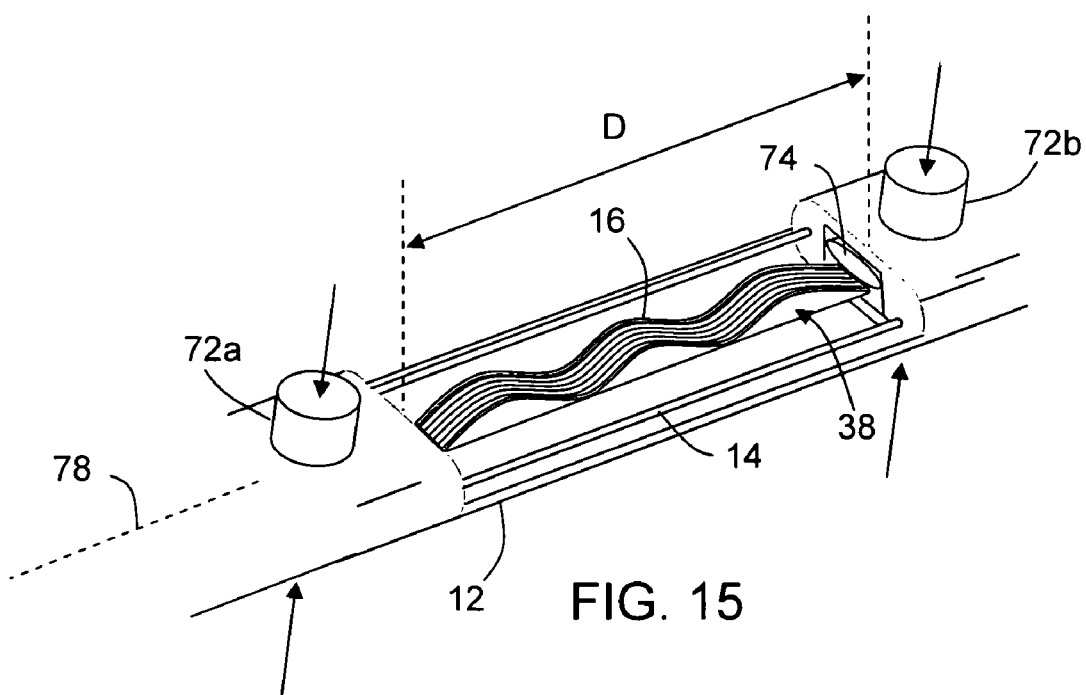
FIG. 15 is a partial cutaway view in perspective showing the preparation for forming a tap in a ribbon cable according to an embodiment of the present invention.

In accordance with an embodiment of the present invention shown in FIG. 15, ribbon cable 10 comprises a plurality of optical fiber ribbons arranged in a parallel stack. To facilitate the method, a clamping apparatus comprising clamps 72a and 72b such as depicted in FIG. 15 may be used to constrain the ribbon cable. In certain embodiments, additional devices, such as crush protectors 74 inserted into cavity 18 on both sides of access portion 48 may be used to prevent crushing of the ribbons by clamps 72a, 72b, and further may prevent excess ribbon length adjacent the access portion of the cable to spread into the access portion and thereby increasing the excess ribbon length of the exposed ribbons.

Accordingly, ribbon cable 10 may be clamped by the clamping apparatus, wherein first clamp 72a and second clamp 72b are engaged with ribbon cable 10 a predetermined distance apart. A first cut may be made in sheath 12 transverse to longitudinal axis 78 of the ribbon cable and around a portion of the perimeter of the sheath. This first cut is made only to a depth of the strength members, with care being taken not to nick or cut the strength members. A similar cut may also be made a predetermined distance away from the first cut on the same side of the strength members as the first cut. In certain embodiments, third and fourth similar cuts may be made a short distance away from the first and second cuts, respectively. Longitudinal slices may then be made in the cable sheath on the same side of the strength members as the transverse cuts in order to remove portions of the cable sheath. For example, the first and third transverse cuts are made, then two longitudinal slices may be made that join the first and third cuts adjacent the two strength members 14, thereby allowing a short portion of cable sheath 12 to be lifted off. The first and third (and second and fourth) cuts should be separated sufficiently to allow the insertion of optional crush protectors 74 into the resulting openings. Crush protectors 74 provide crush protection for the at least one optical fiber ribbon, and also help prevent egress of excess ribbon length from ribbon adjacent the access portion of the cable into the access portion. Crush protectors 74 are disposed between the optical fiber ribbon(s) and clamps, and may comprise tethers or lanyards (not shown) for removing the crush protectors from the cable at a later time, but before coating the access portion.

With optional crush protectors 74 in place, the remainder of the cable sheath on one side of the strength protectors is removed in a manner similar to the way the smaller portions above were removed. Accordingly, cable 10 should afterward appear as shown in FIG. 15, with a predetermined length D of a "top" portion of the cable sheath removed along a predetermined length of the cable, and a corresponding "bottom" portion of the cable sheath opposite the removed top portion remaining intact (longitudinally contiguous). It should be understood that "top" and "bottom" as used herein, and unless otherwise indicated, are arbitrary positions. The removed length D of the sheath may be, for example, greater than about 25 cm, and typically between about 25 and 50 cm. The bottom portion forms a trough or channel that can be used to accommodate form 38.

Figure 16:
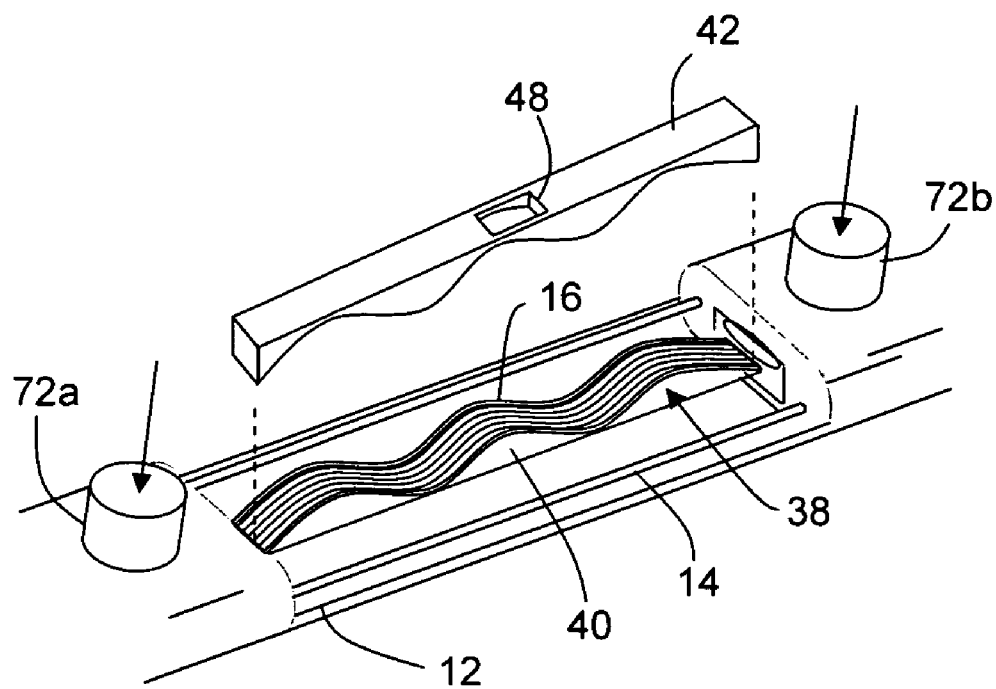
FIG. 16 is a partial cutaway view in perspective showing additional preparations for forming a tap in a ribbon cable according to the embodiment of FIG. 15.

To tap cable 10, the at least one optical fiber ribbon 16 is lifted from the access portion of the cable and first form member 40 positioned at the bottom of the access portion of the cable. The at least one optical fiber ribbon 16 is then positioned over first form member 40. Next, the optical fibers to be separated from the ribbon are identified and severed proximate one end of the access portion of the cable. Because the severed fiber or fibers comprise excess fiber length commensurate with the excess ribbon length of the ribbon from which they were derived, the severed fibers may be longer than the access portion of the cable after being severed. Therefore, after severing the identified fibers, the fibers will be capable of extending further than the length of the access portion of the cable. Second form member 42 may then be positioned over the exposed at least one optical fiber ribbon (FIG. 16), and the severed fibers threaded through aperture 48. Second form member 42 is pressed down on the at least one optical fiber ribbon 16 to conform the ribbon to the serpentine path defined by first and second form members 40, 42.

The free end of the severed optical fiber(s) 56 may be threaded through a short length of buffer tube 60 and one end of buffer tube 60 may, if so designed, be inserted into aperture 48. The free end of optical fiber 56 is spliced to an optical fiber from tether cable 58, and positioned in splice enclosure 54. The splice between the first and second optical fibers is preferably a fusion splice, but may be a mechanical splice in certain embodiments. The splice may be protected by encapsulating the splice, such as with splice tube 61. Splice enclosure 54 may then be positioned adjacent cable 10 and further adjacent to access portion 36. Tether cable 58 may also be coupled to the splice enclosure.

Tether cable 58 may be coupled to the splice enclosure (and ribbon cable 10) by using heat shrink tubing that is extended over both splice enclosure 54 and tether cable 58 and shrunk into place to bond the splice enclosure to the tether cable. For example, the heat shrink tubing could be slid over the free end of the ribbon cable prior to the fusion splice, then slid into position over both ribbon cable 10 and tether cable 58 after the splicing and heated to shrink the tubing and bond the tether cable to ribbon cable 10. Alternatively, pre-formed sleeve 70 could be used that has an interior shape that substantially matches the ribbon cable and the tether cable. In a manner similar to the heat shrink tubing, the pre-formed piece can be slid onto the ribbon cable prior to the making of the access portion and subsequent splice, and after completion of the splicing, slid "forward" so that the piece covers the access portion and at least the splice enclosure, and "welding" the pre-formed piece to the ribbon cable and the splice enclosure.

Once the optical fiber ribbons have been conformed to form 38, access portion 36 may be reconstituted by depositing on the access portion coating 62 that protects the ribbon(s) and constrains form 38. Additional layers may also be included as previously described.

In certain embodiments, a mold may be placed around the access portion of the ribbon cable and an elastomeric core material injected into the space between the mold and the ribbon cable, thereby essentially encapsulating the access portion of the ribbon cable. The elastomeric material may be, for example, a heat curable material. The mold may encompass both the access portion and at least a portion of the splice enclosure. Because first and second form members 40, 42 cover the top and bottom surfaces of the optical fiber ribbon stack, the elastomeric material only contacts and bonds edge portions of the ribbons, and not face portions. Alternatively, in certain other embodiments, the mold may comprise a suitably formed crush tube that remains in place after the elastomeric is cured, thereby providing additional protection to the ribbon cable and/or splice enclosure assembly. In still another embodiment, a mold may be used to apply an elastomeric material over the ribbon cable and optionally the splice enclosure, after which heat shrink tubing (previously positioned on the cable) could be shrunk over the cured elastomeric material. Additional layers may also be provided. For example, the elastomeric first layer may first be molded over the ribbon cable and optionally at least a portion of the splice enclosure. Next, a flexible mesh material may be added over the elastomeric material. A tough outer layer of material may be added overtop the flexible mesh if desired. The flexible mesh may, for example, be a metallic mesh such as a copper mesh, or a cloth mesh. A metallic mesh may be beneficial if the ribbon cable comprises a metallic member (e.g. a metallic armor) and electrical continuity across the tap is desired. Alternatively, the mesh could be eliminated and only an elastomeric core with a second, tough outer layer employed.

Figure 17:
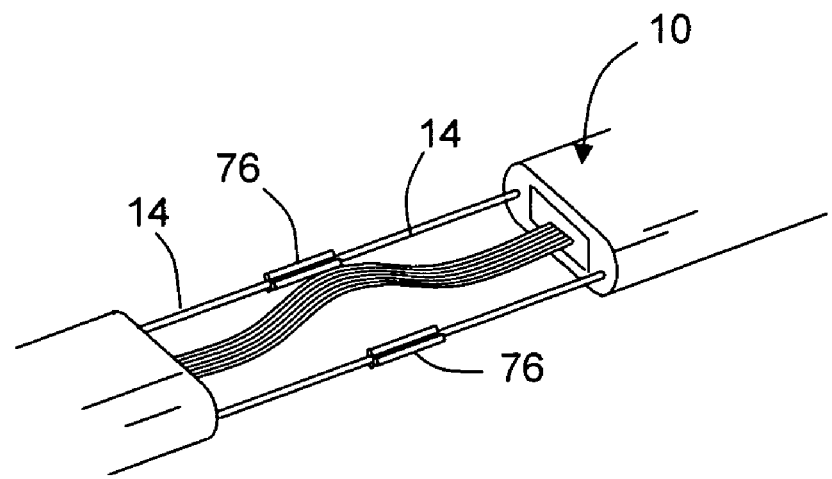
FIG. 17 is a partial cutaway view in perspective of an exemplary ribbon cable according to an embodiment of the present invention wherein the strength members of the cable have been spliced with splints.
Figure 18:
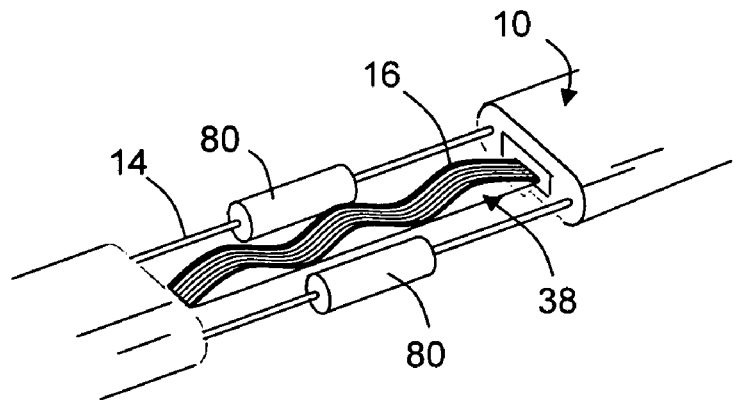
FIG. 18 is a partial cutaway view in perspective of an exemplary ribbon cable according to an embodiment of the present invention wherein the strength members of the cable have been spliced with tubes (ferrules).

In another embodiment shown in FIGS. 17-18, mid-span access to an optical fiber ribbon cable, such as ribbon cable 10, may be performed wherein strength members 14 are severed. For example, repair to a damaged strength member may be required. The present embodiment may utilize breakout of optical fibers of an optical fiber ribbon as described above, or simply comprise mid-span access for other reasons.

In accordance with the present embodiment, a portion of cable sheath 12 is completely removed from ribbon cable 10 along a predetermined length of the cable. The portion of sheath may be removed by ring cutting the cable sheath with a sharp tool transverse to the longitudinal axis of the cable at two locations separated by a predetermined distance. Care should be taken not to damage the optical fiber ribbons disposed inside the cable. A longitudinal slice may then be made in the sheath portion with a sharp tool between the two transverse ring cuts and the sheath portion removed from the cable. In certain embodiments, ribbon cable 10 may include one or more rip cords positioned within the cable sheath that can be used to slice open the sheath portion to be removed. In the case that cable cavity 18 includes a water swellable tape, the water swellable tape should be severed close to the locations at which the ring cuts were made. If necessary, the strength members are then severed approximately mid way, thereby forming two cable sections joined by one or more optical fiber ribbons 16 extending therebetween. The strength members may be shortened if desired.

To reassemble the cable, corresponding strength members may be re-joined by splinting the strength members with a plurality of splints 76 shown in FIG. 17. That is, two opposing strength members are brought together end to end, after which a plurality of small splints 76 may be cemented to the opposing strength members to form a cage around the opposing strength members.

In another embodiment depicted in FIG. 18, the free ends of opposing strength members 14 are inserted into tube 80 containing suitable cement. Preferably the tube comprises a hole about mid-way along the length of the tube to allow air and excess cement to escape from the tube as the opposing strength members are inserted into the tube. The cement may be thermally cured, UV cured, or cured by any other suitable means. Once cured, the cemented tubes provide a strong bond between the opposing strength members. The tubes may comprise, for example, carbon fibers or fiberglass.

It should be noted that in the preceding embodiments wherein the strength members are severed, the distance between the ends of the cable from which the optical fiber ribbon or ribbons protrude (between the ring cuts) may be shorter after reassembly than the original length between the ring cuts. This might be due because it may have been necessary to remove a damaged portion of a strength member. The result is an excess ribbon length that may be longer than the original excess ribbon length. Moreover, because there is at one point during the disassembly no structure other than optical fiber ribbons themselves joining the separated cable sections, the ribbons may become straightened, and additional excess ribbon length gained by relaxation of ribbon still within the original cable structure. In either case, reassembly of the cable should accommodate this extra excess ribbon length.

Figure 19:
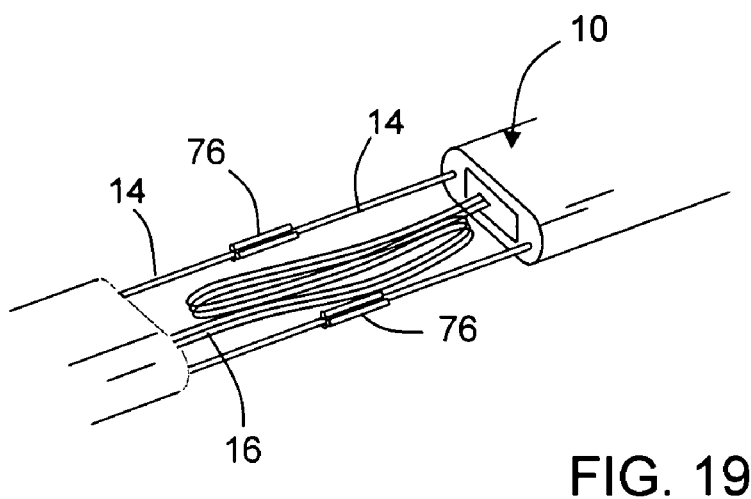
FIG. 19 is a partial cutaway view in perspective of an exemplary ribbon cable according to an embodiment of the invention wherein the express ribbon(s) have been doubled back into an "S" shape.
Figure 20:
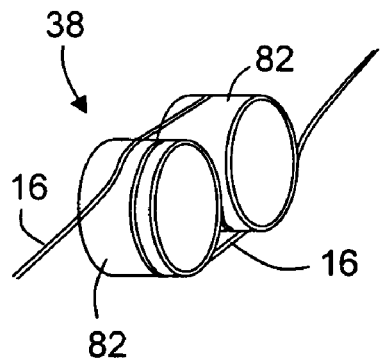
FIG. 20 is a perspective view of a form according to an embodiment of the present invention for conforming an express ribbon to an "S" type shape.

In certain embodiments, such as the embodiment of FIG. 18, the excess ribbon length may be accommodated as before, wherein form 38 is placed between bonded strength members that forces the ribbons into a serpentine shape. In another embodiment, a form is not used, and the ribbon or ribbons are allowed to produce a simple "S" shape as shown in FIG. 19. The "S" shape is characterized by a doubling back of the ribbon or ribbon. The ribbon or ribbons may be constrained, for example, by splitting a suitably sized tube along its length, and positioning the tube around the "S" shaped ribbon or ribbons. The split tube and ribbons contained therein may then be reconstituted within the cable. It should be noted that the "S" shape may be accomplished with or without the use of a form, and with or without severing the strength members. FIG. 20 shows a form 38 comprising two arcuate form members 82 about which a ribbon or ribbons may be wrapped to conform the ribbons into an "S" shape. While form members 82 are shown as circular, the form members could be other shapes, such as elongated ovals to facilitate inclusion within the structure of ribbon cable 10. Alternatively, the form according to FIG. 8 may be used. In any case, reconstitution of cable 10 may be performed as previously described. If a tap is to be made, this too can be accomplished per the preceding description wherein a ribbon comprising the cable is severed and split to produce a fiber having a free end, and joining the free end of the fiber to another fiber (e.g. a tether fiber).

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. For example, it should be noted that a flexible elastic member (such as that approximated by an optical fiber ribbon) when confined within a known space will assume a predictable shape. Thus, it is further contemplated that the at least one optical fiber ribbon within the access portion of the cable may be simply covered, such as by placing a sleeve over the cable that confines the at least one ribbon within a space of known length and known diameter, and therefore conforms the ribbon to a known (i.e. predetermined) shape. All such modifications and variations are intended to be included herein within the scope of this disclosure and the present invention and protected by the following claims.

What is claimed is:

1. A method of performing mid-span access of an optical fiber cable comprising;
   providing an optical fiber ribbon cable comprising a cable sheath and at least one optical fiber ribbon disposed therein, the optical fiber ribbon having a first excess ribbon length;
   removing a portion of the cable sheath to expose a length of the at least one optical fiber ribbon;
   conforming the exposed length of the at least one optical fiber ribbon to a predetermined path, wherein the exposed length of the at least one optical fiber ribbon comprises a second excess ribbon length; and
   covering the exposed length of the at least one optical fiber ribbon with an elastomeric material.

2. The method according to claim 1, wherein the step of conforming comprises conforming the at least one optical fiber ribbon to a form.

3. The method according to claim 2, wherein the form comprises a first member and a second member, and the at least one optical fiber ribbon is positioned between the first and second members.

4. The method according to claim 3, wherein at least one of the first or second members comprises an arcuate surface.

5. The method according to claim 4 wherein the arcuate surface comprises a sinusoidal surface.

6. The method according to claim 2, wherein the step of encapsulating further comprises encapsulating the form with the exposed optical fiber ribbon.

7. The method according to claim 1, wherein the second excess ribbon length is substantially equal to the first excess ribbon length.

8. The method according to claim 1, wherein the optical fiber ribbon cable further comprises at least one strength member, and the at least one strength member is severed, thereby providing a first severed end and a second severed end, and wherein the first and second severed ends are spliced one to the other before the covering step.

9. The method according to claim 1, wherein the optical fiber ribbon cable comprises a plurality of optical fiber ribbons, and the covering step bonds edges of the optical fiber ribbons together.

10. The method according to claim 1, wherein the step of encapsulating comprises injecting the elastomeric material into a mold surrounding the exposed portion of the at least one optical fiber ribbon.

11. The method according to claim 1, wherein the step of covering comprises depositing a mesh material over the elastomeric material.

12. The method according to claim 11, wherein the mesh material is a metal mesh.

13. The method according to claim 12, further comprising coating the mesh material.

14. The method according to claim 1, further comprising a layer of a second material disposed about the elastomeric material, wherein the elastomeric material is softer than the layer of second material.

15. A method of performing mid-span access of an optical fiber cable comprising:
    providing an optical fiber ribbon cable comprising a cable sheath defining a cavity, and at least one optical fiber ribbon disposed within the cavity, the optical fiber ribbon comprising at least two optical fibers and having an excess ribbon length;
    removing a portion of the cable sheath to form an access opening to the cavity and expose a length of the at least one optical fiber ribbon;
    conforming the exposed length of the at least one optical fiber ribbon to a predetermined path defined by a form; and
    covering the exposed length of the at least one optical fiber ribbon and the form with an elastomeric material that protects the exposed length of the at least one optical fiber ribbon and the form.

16. The method according to claim 15, wherein the form is disposed within the cavity.

17. The method according to claim 15, wherein the form comprises a first member and a second member and the second member defines an aperture through which at least one optical fiber of the optical fiber ribbon is passed.

18. The method according to claim 15, wherein the form comprises a first member and a second member, and the step of conforming comprises positioning the at least one optical fiber ribbon between the first and second members.

19. The method according to claim 18, wherein the first member is complementary to the second member.

20. The method according to claim 18, wherein at least one of the first or second members comprises a substantially sinusoidal surface.

21. The method according to claim 18, wherein the excess ribbon length of the at least one optical fiber ribbon after the step of encapsulating is substantially equal to the excess ribbon length of the at least optical fiber ribbon before the step of removing a portion of the cable sheath.

22. The method according to claim 17, further comprising forming a splice between the at least one optical fiber extending through the aperture and another optical fiber.

23. The method according to claim 22, wherein the splice is enclosed in a splice enclosure, and the step of covering comprises bonding the splice enclosure to the optical fiber ribbon cable.

24. The method according to claim 15, wherein the covering step comprises injecting the elastomeric material into a mold surrounding the exposed length of the at least one optical fiber ribbon.

25. The method according to claim 15, wherein the covering step comprises covering the elastomeric material with a mesh material.

26. The method according to claim 25, wherein the mesh is a metal mesh.

27. A method of performing mid-span access of an optical fiber cable comprising:
providing an optical fiber ribbon cable comprising a cable sheath, at least one optical fiber ribbon, and at least one strength member, the optical fiber ribbon comprising at least two optical fibers and having a first excess ribbon length;
removing a portion of the cable sheath to expose a length of the at least one optical fiber ribbon;
severing the at least one strength member to form a first severed end and a second severed end;
conforming the exposed length of the at least one optical fiber ribbon to a predetermined path having a second excess ribbon length;
rejoining the at least one severed strength member by splicing the first severed end to the second severed end; and
covering the exposed length of the at least one optical fiber ribbon with an elastomeric material that protects the exposed length of the at least one optical fiber ribbon and the form.

28. The method according to claim 27, wherein the step of conforming comprises conforming the exposed portion of the at least one optical fiber ribbon to a form.

29. The method according to claim 28, wherein the form comprises a first member and a second member, and the step of conforming comprises positioning the at least one optical fiber ribbon between the first and second members.

30. The method according to claim 28, wherein at least one of the first or second members comprises a sinusoidal surface.

31. The method according to claim 28, wherein the splicing comprises splinting the first and second severed ends with a plurality of splints.

32. The method according to claim 28, wherein the splicing comprises securing the first and second severed ends in a tube with an adhesive.

33. An optical fiber ribbon cable comprising:
a cable jacket comprising a virgin portion and an access portion;
at least one optical fiber ribbon disposed within the cable jacket, the at least one optical fiber ribbon comprising a first excess ribbon length within the virgin portion of the ribbon cable and a second excess ribbon length within the access portion of the ribbon cable;
an elastomeric material disposed over the access portion; and
wherein a length of the at least one optical fiber ribbon in the access portion of the ribbon cable is conformed to a form for managing the second excess ribbon length.

34. The optical fiber ribbon cable according to claim 33, wherein at least one surface of the form has a serpentine shape.

35. The optical fiber ribbon cable according to claim 33, wherein the form comprises a first form member and a second form member, and the at least one optical fiber ribbon is disposed therebetween.

36. The optical fiber ribbon cable according to claim 35, wherein the second form member comprises a compliant material.

37. The optical fiber ribbon cable according to claim 33, wherein one of the first or second form members comprises an aperture through which at least one optical fiber of the at least one optical fiber ribbon extends.

38. The optical fiber ribbon cable according to claim 36, wherein the at least one optical fiber extending through the aperture is spliced to another optical fiber at a splice point.

39. The optical fiber ribbon cable according to claim 38, further comprising a buffer tube for containing the at least one optical fiber between the second form member and the splice point.

40. The optical fiber ribbon cable according to claim 39, wherein the other optical fiber is disposed within an enclosure that is bonded to the optical fiber ribbon cable.

41. The optical fiber ribbon cable according to claim 33, further comprising a strength member, the strength member comprising a spliced portion within the access portion of the ribbon cable.

42. The optical fiber ribbon cable according to claim 33, wherein the second excess fiber length is substantially equal to the first excess fiber length.

43. The optical fiber ribbon cable according to claim 33, wherein the reconstituted portion comprises a mesh material.

* * * * *